United States Patent [19]

Usami et al.

[11] Patent Number: 4,865,884
[45] Date of Patent: Sep. 12, 1989

[54] METHOD FOR ISOLATING COMPONENTS IN MULTI-PART COMPOSITION

[75] Inventors: Ikuzo Usami, Kanagawa; Yoshinori Sato, Sagamihara; Masakazu Sumitomo, Hachioji, all of Japan

[73] Assignee: Three Bond Co., Ltd., Tokyo, Japan

[21] Appl. No.: 80,726

[22] Filed: Jul. 31, 1987

[30] Foreign Application Priority Data

Aug. 4, 1986 [JP] Japan .................................. 61-182012

[51] Int. Cl.$^4$ .......................... B05D 3/02; B05D 5/00; B05D 29/10
[52] U.S. Cl. ..................................... 427/256; 53/474; 206/221; 252/315.1; 427/385.5; 427/386
[58] Field of Search .................... 427/197, 256, 385.5, 427/386; 428/141, 144, 145, 147; 425/543, 544; 206/219, 221, 568; 53/428, 431, 445, 474; 252/315.1, 315.4

[56] References Cited

U.S. PATENT DOCUMENTS

| | | | |
|---|---|---|---|
| 3,462,008 | 8/1969 | Tibbs | 53/474 X |
| 4,158,073 | 6/1979 | Schneider et al. | 427/197 X |
| 4,161,250 | 7/1979 | Pierce | 427/197 X |
| 4,278,483 | 7/1981 | Mansolillo | 427/197 X |
| 4,357,961 | 11/1982 | Chick | 206/221 X |
| 4,502,975 | 3/1985 | Kobayashi et al. | 210/922 X |
| 4,680,916 | 7/1987 | Ginn | 53/474 X |

Primary Examiner—Michael Lusignan
Attorney, Agent, or Firm—Martin A. Farber

[57] ABSTRACT

A method for isolating components in a multi-part composition is disclosed herein. In this method, the individual components are preserved in an isolation relation, and if intended to be used, they are mixed. The components each contain a consistency imparting agent added thereto and are applied onto a support plate in such a manner that the different components are disposed in close vicinity to one another. Such multi-part compositions may be used as adhesives, sealants, coatings, casting materials and the like. The components may be applied in various patterns.

16 Claims, 4 Drawing Sheets

METHOD FOR ISOLATING COMPONENTS IN MULTI-PART COMPOSITION

BACKGROUND OF THE INVENTION

1. Field of the Invention

The present invention relates to a method for isolating components in a multi-part composition, wherein prior to use, the components are preserved in an isolated relation and when intended to be used, they are mixed together and placed into service and particularly, in use, the individual components can be easily picked up and mixed at a predetremined ratio.

2. Description of the Prior Art

Adhesives, coatings, casting materials, etc., are principally placed into service by mixing a primary component such as epoxy, unsaturated polyester, vinylester, polyurethane, silicone and polymercapto resins, with a curing agent as a secondary component and further a cure accelerator as a third component, and then causing a curing phenomenon through a chemical reaction to cure them. Such multi-part compositions are preserved with the individual components separately isolated from one another prior to use and when to be used, they are mixed together and placed into service. Therefore, it is necessary to ensure that such a multi-part composition is preserved with individual components separately isolated from one another in such a manner that they are not mixed together.

It is conventionally known to use a vessel or container as shown in FIG. 13 in such a preservation of a multi-part composition in an isolated manner. As evident from FIG. 13(a), this vessel or container 1 is constructed with its interior being divided into a space 3 and a space 4 by a partition 2. For example, a primary component such as an epoxy resin is filled into the space 3 and a curing agent is filled into the space 4. Then, the vessel is shielded with a cover layer 5 through a heat sealing treatment, so that the primary component and the curing agent are contained in a separately isolated relation. When such two-part composition is intended to be used, the cover layer 5 is stripped and then, the section of the space 3 is depressed down to deform the vessel 1 into a shape as shown in FIG. 13(b), thereby mixing the primary component with the curing agent.

Alternatively, a method has been adopted for containing and preserving multiple components in separate vessels, wherein when to be used, these components are picked up from the respective separate vessels and transferred into a new sepcial small container where they are stirred and mixed by a stirring bar and thus placed into service.

With the former method, however, it is not easy to depress down the section of the space 3 in the vessel shown in FIG. 13 and in addition, from the viewpoint of material quality, there is a disadvantage that a special material having a flexibility must be selected.

With the latter method, there is required an operation fro transferring the contained components when they are to be mixed, resulting in a longer time and also in an increased variation in ration of components.

OBJECT OF THE INVENTION

It is an object of the present invention to provide a method for isolating components in a multi-part composition, wherein the components can be easily picked up and mixed at a predetermined ratio when intended to be used, and wherein the disadvantages found in the above known prior art is overcome.

SUMMARY OF THE INVENTION

According to the present invention, the above object is accomplished by providing a method for isolating components in a multi-part composition, the components being preserved in an isolated relation, and when intended to be used, the components being mixed together and then placed into service, wherein the components each contain a consistency imparting agent added thereto and are applied onto a support plate in such a manner that the different components are disposed in close vicinity to one another.

If such individual components containing a consistency imparting agent are applied onto a support plate in the above manner, the individual components are isolated from one another in a jellied or gelatinizated condition on the support plate. If intended to be used, the components on the support plate can be easily mixed and cured at a predetermined ratio by squashing and mixing them in any area by use of a spatula. Therefore, the operation is extremely simple, and a variation in ratio of components cannot be produced.

The above and other objects, features and advantages of the invention will become apparent from reading of the following detailed description taken in conjunction with the accompanying drawings.

BRIEF DESCRIPTION OF THE DRAWINGS

FIG. 13 is an illustration of the conventional isolation-preserving vessel;

DETAILED DESCRIPTION OF THE INVENTION

The above-described multi-part compositions are preserved with individual components isolated prior to use, and when intended to be used, the components are mixed together and placed into service. Such multi-part compositions are those such as adhesives, sealants, coatings, casting materials, etc., each comprising a primary component and a curing agent and further containing a cure accelerator as a third component if desired. Specific examples of the primary components are epoxy, unsaturated polyester, acrylic, silicone, polyurethane and polymercapto resins.

The above-described multi-part composition is usually in the form of a liquid, but may be in the form of a powder or the like.

In the present invention, each of the components in the multi-part composition contains a consistency imparting agent added thereto. The consistency imparting agent which may be used include those commercially available, and specific examples of them are benzylidene sorbitol, lauroylglutamic dibutylamide, organo-bentonites, asbestos powders, silica powders, hydrogenated caster oils, etc. The amount of consistency imparting agent added may be of any level depending upon the type and viscosities of the components, but should be in a range sufficient to provide a consistency, i.e., a jellied condition, sufficient so that the consistency imparting agent cannot be mixed with the other liquid component.

Further, in the present invention, the individual components containing the above-described type of a consistency imparting agent added thereto are applied onto a support plate in such a manner that the different components are disposed in close vicinity to one another.

Figure 1:
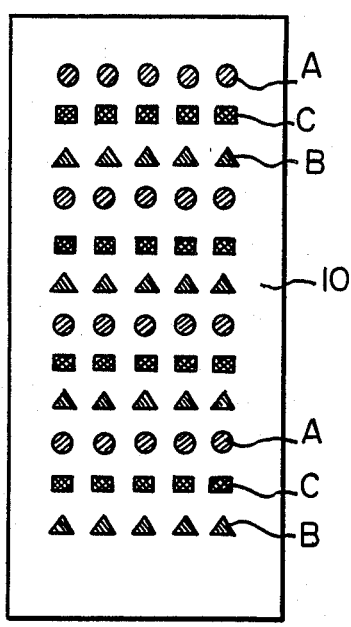
FIGS. 1 and 2 illustrate patterns of three-part composition applied in accordance with the present invention.
Figure 2:
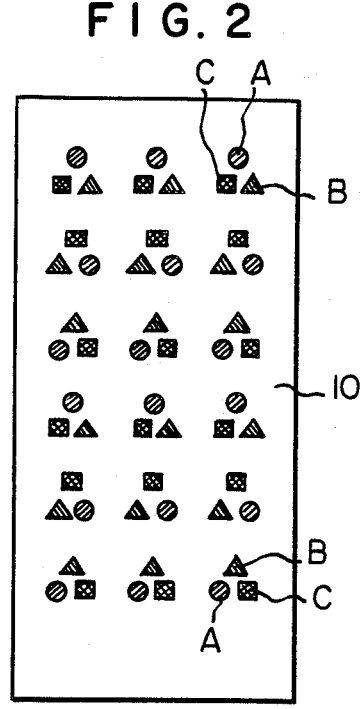
Figure 3:
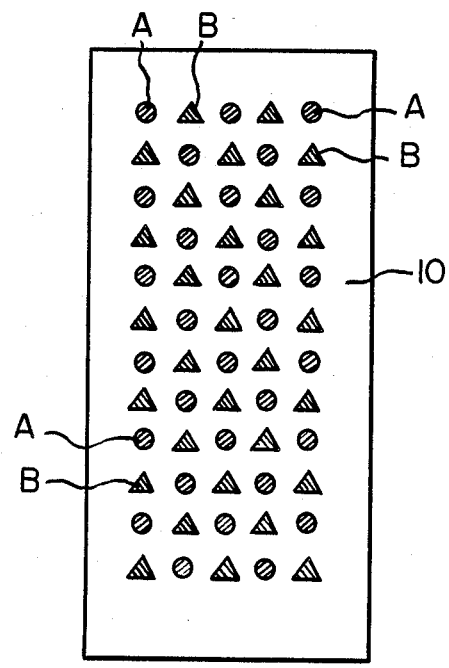
FIGS. 3 to 12 illustrate patterns of two-part composition applied.
Figure 4:
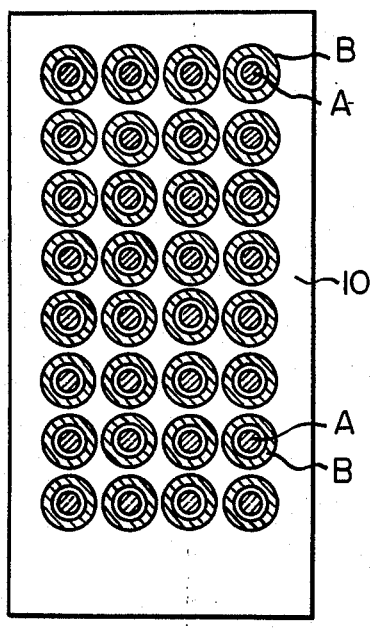
Figure 5:
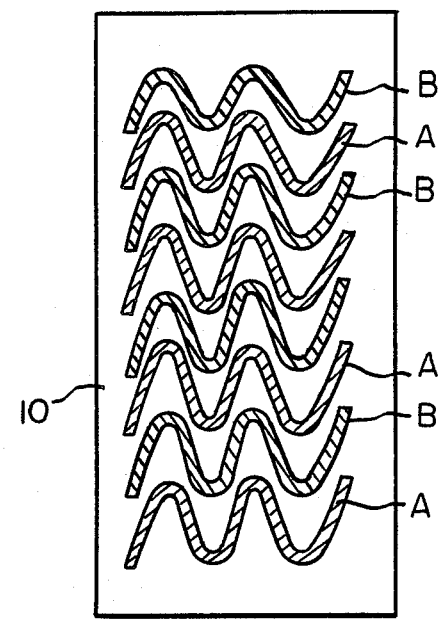
Figure 6:
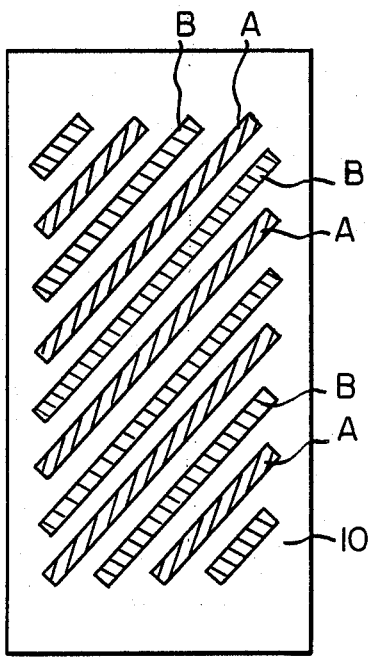
Figure 7:
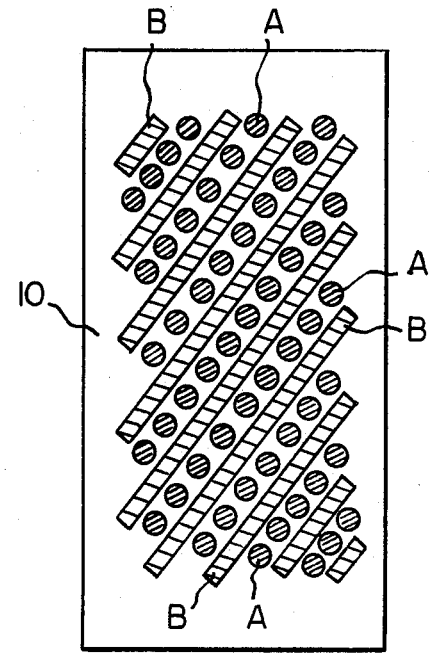
Figure 8:
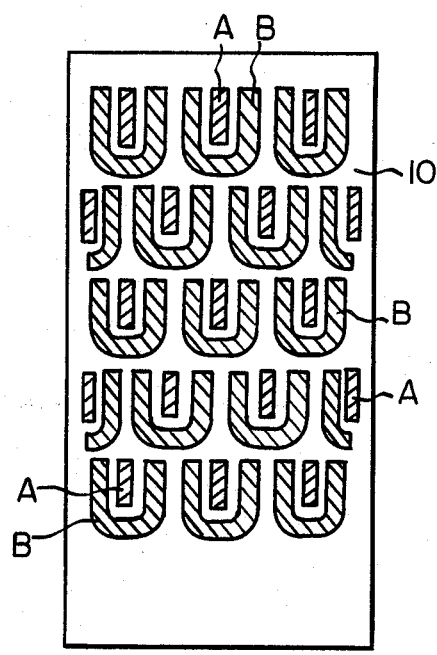
Figure 9:
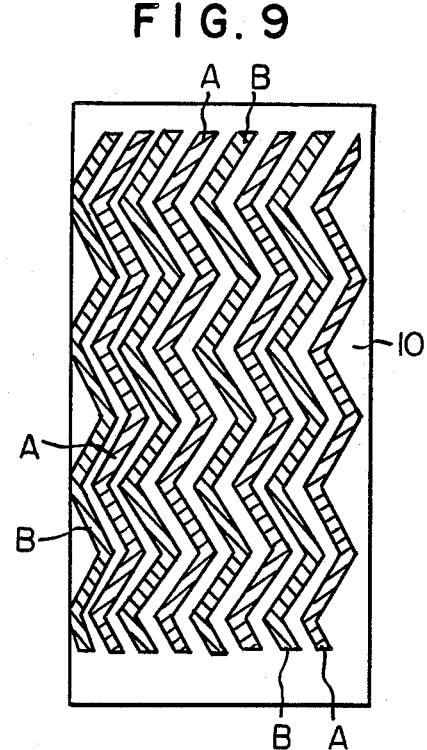
Figure 10:
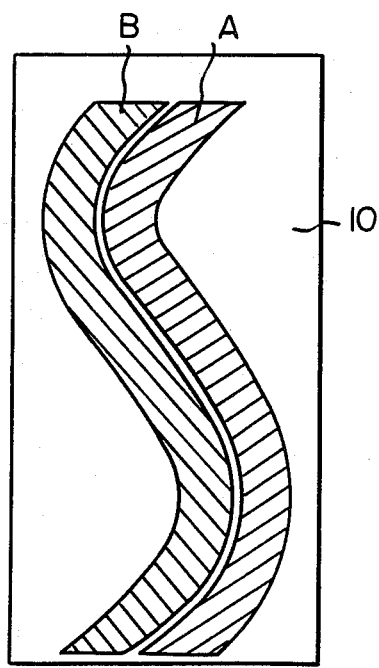
Figure 11:
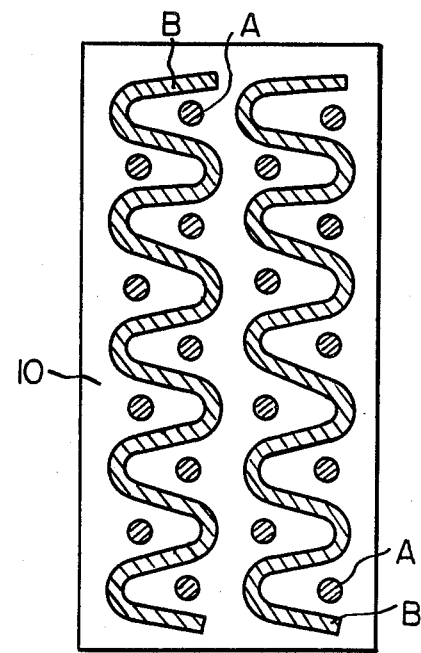
Figure 12:
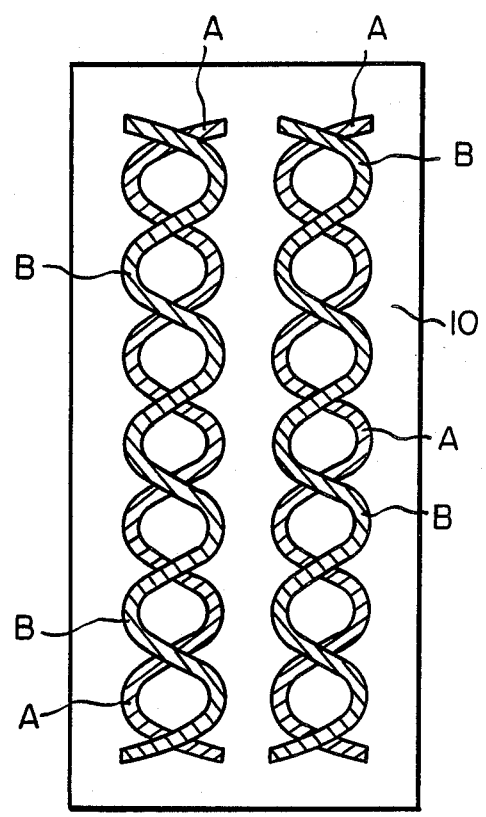
Figure 13A:
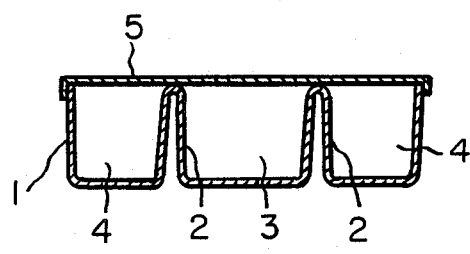
FIG. 13(a) illustrates a condition of components isolated.
Figure 13B:
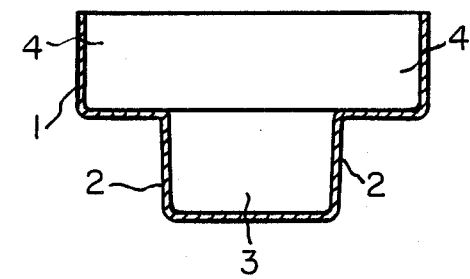
FIG. 13(b) illustrates a condition of components mixed.

Examples of applied patterns are illustrated in FIGS. 1 to 12. Among these Figures, FIGS. 1 and 2 illustrate examples of patterns of three-part composition applied, FIG. 1 illustrating an example where components A, B and C are applied respectively in the form of laterally arranged dots on a support plate 10 by an injector, and FIG. 2 illustrating an example where the components A, B and C are applied in groups of dots, each of groups consisting of three different components and the groups being arranged longitudinally and laterally on the support plate 10. FIGS. 3 to 12 illustrate examples of patterns of two-part composition applied, FIG. 3 illustrating an example where two components A and B are applied respectively in the form of dots in an adjacently arranged relation on the support plate 10 by the injector. FIG. 4 illustrates an example where the component A is applied in the form of a large number of dots arranged on the support plate 10, with the component B applied in a ring-like configuration around each of the dots of component A. FIG. 5 illustrates an example where the components A and B are applied respectively in the form of curved lines alternately arranged on the support plate 10. FIG. 6 illustrates an example where the components A and B are applied respectively in the form of obliquely straight lines alternately arranged on the support plate 10. FIG. 7 illustrates an example where the component A is applied in the form of arrays of obliquely rectilinearly arranged dots, and the component B is applied in the form of obliquely rectilinear bands arranged alternately with each obliquely rectilinear dot array of the component A. FIG. 8 illustrates an example where the component B is applied in a U-shaped configuration, with the component A applied in a bar-shaped configuration within the U shape of the component B, with a large number of such units being arranged on the support plate 10. FIG. 9 illustrates an example where the components A and B are applied respectively in the form of folded lines in an alternately arranged relation to each other. FIG. 10 illustrates an example where the components A and B are applied in the form of the same band-like curved lines arranged in parallel on the support plate 10. FIG. 11 illustrates an example where the component B is applied in the form of curved lines, and the component A is applied in the form of dots each of which is within each of recesses defined by such curved lines. FIG. 12 illustrate an example where the component A is applied in the form of a curved line, and the component B is applied in the form of a similarly shaped but oppositely curved line in an overlapped relation to the curved line of the component A.

It should be noted that in the present invention, such application of the components may be carried out by any other known methods such as a screen sprinting process, in addition to the process by the injector.

Additionally, the support plates 10 used in the present invention include any flat plates which are chemically non-reactive with each of components in a multi-part composition to be applied thereon and have an impervious property and a heat resistance.

Operation

In the present invention, "gelatinization" is referred to indicate a condition where the consistency of a liquid is increased. However, the viscosity is at most 10,000 to 15,000 poises or less. Therefore, such condition is such that components cannot be mixed with each other by merely contacting them, but if they are squashed by a spatula or the like for mixing, they may be easily mixed.

In the present invention, each of components is gelatinizated by addition of a consistency imparting agent into a condition where each component is not mixed with another liquid component. Accordingly, the individual components in a multi-part composition are isolated from one another on a support plate.

Further, if intended to be used, the individual components in the multi-part composition may be squashed on the support plate by a spatula or the like and thereby easily mixed. In this way, they are placed in service.

Moreover, in the present invention, different components are applied in close vicinity to one another and hence, the individual components may be automatically picked up and mixed at a predetermined ratio by squashing them in any aera on the support plate by use of the spatula or the like to mix them. In this case, the ratio of the individual components can be set at any level by employing any applying method such as those shown in FIGS. 3 to 12.

EXAMPLES

Example 1

The following epoxy resins were prepared for a two-part composition.

Primary component: Epicoat #828 (Bisphenol type epoxy resin available from Oil Shell, Co., ltd.)

Curing agent: TB2106B (Modified alicyclic polyamine available from Three Bond, Co. Ltd.)

Coregurane GP-1 (lauroylglutamic dibutylamide available from Ajinomoto, Co. Ltd.) was added as a consistency imparting agent to each of the primary component (liquid A) and the curing agent (liquid B) in an amount of 5 parts by weight per 100 parts by weight. The components A and B were applied and gelatinizated or jellied in the form of dots onto a flat plate by an injector, as shown in FIG. 3. The injector used was PMC-502K made by Nippon Epy Industry Co., Ltd.).

The components A and B were isolated from each other on the flat plate by the gelatinization.

Then, the jellied or gelatinizated components A and B on the flat plate were squashed and mixed in any area by use of a spatula. They were picked up at a ratio of approximately 1:1, mixed and cured.

Example 2

The following acrylic resins were prepared for a twopart composition.

Primary component (liquid A):TB3926 (an acrylic resin available from Three Bond, Co., Ltd.)

Curing agent (liquid B):TB3926 (a curing agent available from Three Bond, Co., Ltd.)

Aerozeel #200 (a fine powder of silica available from Aerozyl Co., Ltd.) was added as a consistency imparting agent to each of the primary component (liquid A) and the curing agent (liquid B) in an amount of 4 parts by weight per 100 parts by weight. The components A and B were applied and gelatinizated onto a flat plate by an injector, as shown in FIG. 5.

The components A and B were isolated from each other on the flat plate by the gelatinization.

Then, the gelatinizated components A and B on the flat plate were squashed and mixed in any area by use of a spatula. They were picked up at a ratio of approximately 1:1, mixed and then cured in 1.5 to 2.5 minutes.

What is claimed is:

1. A method for isolating components in a multi-part composition, said components being preserved in an isolated relation, and when intended to be used, said components being mixed together for causing a curing reaction thereof, and then placed into service, wherein said components each contain a consistency imparting agent added thereto and are applied onto a support plate in such a manner that the different components are disposed as a multiplicity of separate bodies spaced apart from each other on said support plate and in close vicinity to one another, said consistency imparting agent being selected from the group consistency of benzylidene sorbitol, lauroylglutamic dibutylamide, organobentonites, asbestos powders, silica powders and hydrogenated caster oils.

2. A method for isolating components in a multi-part composition according to claim 1, wherein one of said components is applied in the form of curved lines, and the other component is applied in the form of the similarly shaped but oppositely curved line in an overlapped relation to the curved line of said one component.

3. A method for isolating components in a multi-part composition according to claim 1, wherein said individual components are applied respectively in the form of laterally arranged dots on the support plate.

4. A method for isolating components in a multi-part composition according to claim 1, wherein said individual components are applied in groups of dots, each of said groups consisting of the different components, and said groups being arranged longitudinally and laterally on the support plate.

5. A method for isolating components in a multi-part composition according to claim 1, wherein said individual components are applied respectively in the form of dots in an adjacently arranged relation on the support plate.

6. A method for isolating components in a multi-part composition according to claim 1, wherein one of said components is applied in the form of a large number of dots arranged on the support plate 10, with the other component applied in a ring-like configuration around each of the dots of the one component.

7. A method for isolating components in a multi-part composition according to claim 1, wherein the different components are applied respectively in the form of curved lines alternately arranged on the support plate.

8. A method for isolating components in a multi-part composition according to claim 1, wherein the different components are applied respectively in the form of obliquely straight lines alternately arranged on the support plate.

9. A method for isolating components in a multi-part composition according to claim 1, wherein one of said components is applied in the form of arrays of obliquely rectilinearly arranged dots, and the other component is applied in the form of obliquely rectilinear bands arranged alternately with each obliquely rectilinear dot array of the one component.

10. A method for isolating components in a multi-part composition according to claim 1, wherein one of said components is applied in an U-shaped configuration, with the other component applied in a bar-shaped configuration within the U shape of the one component, with a large number of such units being arranged on the support plate.

11. A method for isolating components in a multi-part composition according to claim 1, wherein the different components are applied respectively in the form of folded lines in an alternately arranged relation to each other.

12. A method for isolating components in a multi-part composition according to claim 1, wherein said different components are applied respectively in the form of the same band-like curved lines arranged in parallel on the support plate.

13. A method for isolating components in a multi-part composition according to claim 1, wherein one of said components is applied in the form of curved lines, and the other component is applied in the form of dots each of which is within each of recesses defined by said curved lines.

14. A method for isolating components in a multi-part composition, comprising steps of
locating said components on a substrate, the components being disposed as a multiplicity of separate bodies spaced apart from each other on said substrate and adjacent each other in a multiplicity of adjacent spaced-apart locations, said locating on the substrate allowing for storage prior to use;
upon use, mixing together the components at all of said locations to provide a mixture;
allowing the mixture to cure for emplacing a cured mixture into service; and wherein
said components include a consistency imparting agent added thereto to facilitate mixing and curing.

15. A method for isolating components in a multi-part composition according to claim 14, wherein
said consistency imparting agent is selected from the group consisting of benzylidene sorbitol, lauroylglutamic dibutylamide, organobentonites, asbestos powders, silica powders and hydrogenated castor oils.

16. A method for isolating components in a multi-part composition according to claim 14, further comprising a step of
disposing the components at each of said locations in a gelatinous form by which a component adheres to said substrate, said gelatinous form allowing the mixing of said components upon use of the components.

* * * * *